Figure 1:
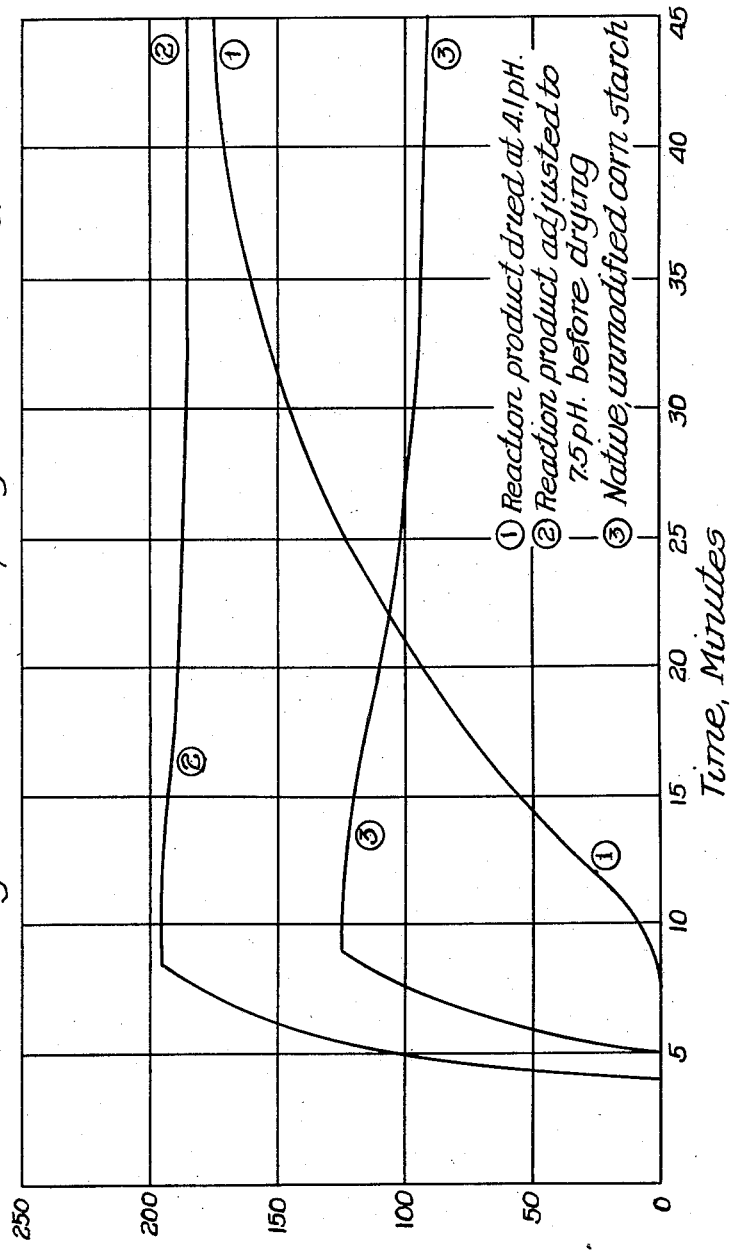

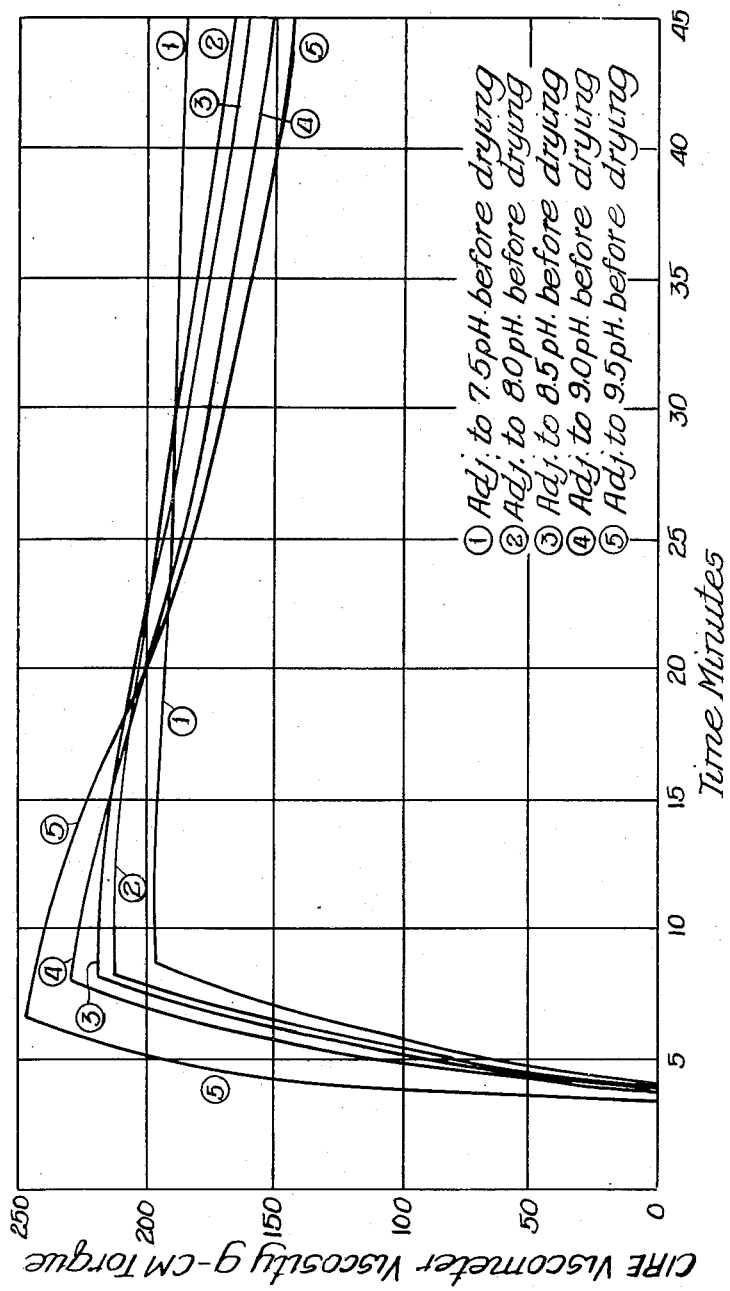

2,838,465

THICK-PASTING STARCH CONTAINING UREA-FORMALDEHYDE AND PROCESS OF MAKING THE SAME

Thaddeus Porowski, Wheaton, Ill., assignor to A. E. Staley Manufacturing Company, Decatur, Ill., a corporation of Delaware Application June 18, 1957, Serial No. 666,807

11 Claims. (Cl. 260—17.3)

This invention relates, generally to improvements and innovations in starch to be used for preparing thickened starch paste. More particularly, the invention relates to the manufacture of a thick-pasting starch characterized by its ability to cook rapidly to form a high viscosity paste which will retain its viscosity at a relatively stable level at high temperatures.

This application is a continuation-in-part of my prior application Serial No. 433,377, filed June 1, 1954, now abandoned.

In Patent No. 2,407,071, dated September 3, 1946, a method of making a thick-pasting starch is disclosed which involves reacting native starch with dimethylol urea at a pH in the range of 1.5–7.0, adjusting the pH of the reaction medium within the range of 4.5–7.0 if not already in that range, and then filtering and drying.

While thick-pasting starch may be manufactured satisfactorily according to the procedure disclosed in Patent No. 2,407,071, it has been discovered in accordance with the present invention that an improved thick-pasting starch product may be obtained by departing significantly from the process disclosed in Patent No. 2,407,071, making use of unobvious innovations.

While the disclosure of Patent No. 2,407,071 indicates that the starch-resin reaction may be carried out in a broad pH range of 1.5–8, it has been found in practicing the present invention that, preferably, the pH of the reaction medium should be in the range of from 3 to 5. Furthermore, whereas, Patent No. 2,407,071 teaches that after the reaction the pH of the medium should be adjusted to 4.5–7.0 before filtering, it was discovered according to the present invention that the reacted starch-resin medium should be made alkaline before it is filtered and dried. Usually there is no advantage in adjusting the pH value of the starch-resin medium higher than 10. When these innovations are followed, the resulting thick-pasting starch has the ability to cook rapidly to a high viscosity in either alkaline tap water, distilled water or acid water, and to retain this viscosity at a fairly stable level at high temperatures.

Accordingly, the object of the present invention, generally stated, is the provision of an improved thick-pasting starch product and a method of making the same.

An object of the present invention is the provision of a thick-pasting starch product characterized by its ability to cook rapidly and equally well in water at paste pH values ranging from about 4 to 10 and form a high viscosity paste which has excellent hot viscosity stability for prolonged periods of time.

Another object of the invention is a method of preparing a thick-pasting starch product having the foregoing characteristics by reacting unmodified starch and a small amount of a water-soluble, heat-reactive urea-formaldehyde composition including monomethyl urea (MMU) and dimethylol urea (DMU).

Certain other objects of the invention will, in part, be obvious and will, in part, appear hereinafter.

For a more complete understanding of the nature and scope of the invention, reference may now be had to the following detailed description thereof taken in conjunction with the accompanying drawings wherein Figs. 1–4 are viscosity temperature curves which serve to bring out more clearly the nature and advantages of applicant's invention. Each of these figures will be described below.

The general procedure for preparing the novel and improved thick-pasting starch products in accordance with this invention is briefly as follows: Unmodified starch is slurried in water and the urea formaldehyde composition (e. g. DMU) is added in a proportion of 0.05–0.15% based on the dry weight of the starch. It is desirable to dissolve the DMU in alkaline water so as to prevent resinification before it is added to the starch. This also increases the rate of solubility of the DMU. The water may be made alkaline with a small amount of lime or disodium phosphate. Preferred proportions of the urea formaldehyde composition are from 0.07–0.1%. The concentration of the starch slurry is not critical but preferably should be kept in the range of about 18 to 22° Bé. in order to minimize the bulk to be handled and filtered. The pH of the slurry is adjusted as required to a pH of from 3 to 5. This reaction medium is then heated to a temperature substantially below the gelatinizing temperature of the starch, a temperature in the range of about 100–120° F. being satisfactory. While the reaction will proceed at a temperature as low as room temperature (i. e. 70° F.), the rate is much slower and therefore it is normally desirable to heat the reaction medium. Preferably the medium is stirred during the reaction sufficiently to promote a uniform reaction. After the reaction is sufficiently complete (e. g. 1–4 hours) it is made alkaline up to a pH of about 10, a pH of 8 being very satisfactory, by addition of soda ash, caustic soda or other suitable alkaline reagent. The alkaline reaction medium is then filtered and dried.

The following examples are illustrative presently preferred embodiments of the invention:

Example 1

A single-washed starch slurry was used containing 40 parts by weight of unmodified corn starch and 60 parts of water and having a pH of 4.1. 0.03 parts by weight of dimethylol urea (Du Pont "Arboneeld" A) was dissolved in 0.15 parts of water made alkaline to litmus by the addition of a small amount of disodium phosphane. The solution of dimethylol urea was added to the starch slurry. The temperature of the reaction medium was maintained at 100° F. and a mechanical agitator was used to stir the reaction medium. After 2 hours the pH of the reacted medium was adjusted to 7.5 by the addition of sodium carbonate and then it was filtered and the filter cake washed and dried. The resulting product was in dry granular form and cooked rapidly in water to form a thick paste which maintained its viscosity at a stable level for 4 hours (i. e. the end of the test). This thick paste may be used in applications where increased viscosity over that produced by the native starch is desired, e. g. adhesives for use in making paperboard and paper bags and in ore flotation. The Scott viscosity of the unreacted starch used in this example was 82 and the thick-pasting starch-DMU reaction product had a Scott viscosity of 341. The Scott test is a recognized procedure for determining viscosity. (See Kerr—Chemistry and Industry of Starch, page 119, 2nd edition.)

Example 2

A slurry was used containing 40 parts by weight of native corn starch and 60 parts of water and having a pH of 4.0. There was added to the starch slurry a solution containing 0.05 parts by weight of monomethylol urea (Du Pont "Arboneeld" B) and 0.2 part by weight of water. The reaction mixture was heated to 105° F. and held at that temperature for 2½ hours, using mechanical agitation. The pH was adjusted to 7.5 with sodium carbonate and the reaction mixture was filtered. The filter cake was washed and then dried. The resulting dry product cooked rapidly in water to form a thick paste which retained its viscosity at a stable level while remaining at 207° F. for several hours. The Scott viscosity of the hot paste was 308. The starch paste so produced is useful for the purposes pointed out in Example 1.

*Example 3*

A slurry was used containing 40 parts by weight of native corn starch and 60 parts of water. 0.04 parts by weight of a water-soluble urea-formaldehyde resin (American Cyanamid Co. "Urac 180") was dissolved in 0.1 part of water. The solution of urea-formaldehyde resin was added to the starch slurry and sufficient hydrochloric acid was added to adjust the slurry to 4.3 pH. The temperature of the reaction medium was raised to 105° F. and the reaction medium was stirred by a mechanical agitator. After 2 hours the reaction medium was adjusted to 7.5 pH by the addition of sodium carbonate, and then it was filtered. The filter cake was washed and dried. The resulting dry product cooked rapidly in water to form a thick paste which retained its viscosity at a stable level for several hours (until the end of the test) at 207° F. The Scott viscosity of unreacted native starch was 60. The Scott viscosity of the thick-pasting starch-resin reaction product was 279. The starch paste so produced is useful for the purposes pointed out in Example 1.

While unmodified, native starches in general may be made into thick-pasting starch in accordance with the present invention, the invention is particularly useful in connection with corn starch both by reason of its commercial importance and by reason of the large increase in viscosity which may be obtained.

The nature of the invention is further brought out in connection with the curves contained in the drawings wherein viscosity-time relationships for starch-DMU reaction products are plotted. In Fig. 1 curve 1 was obtained with a starch-DMU reaction product wherein 0.07% dimethylol urea was reacted with native corn starch at pH 4.1 and the starch-DMU reaction product was dried and recovered without a final pH adjustment. Curve 2 was obtained with a starch-DMU reaction product obtained by reacting 0.07% dimethylol urea with corn starch at a pH of 4.1 and with an adjustment of the pH to 7.5 before filtering and drying. Curve 3 represents a control based on the starch alone with no dimethylol urea being used.

In obtaining the curves, 50 grams of the dry substance were dispersed into 950 grams of tap water having a pH of 8.1. The Corn Industries Research Foundation (CIRF) Viscometer was used which is a continuous type viscosimeter which records on a chart the cooking history of starch dispersed in water. The viscosity is recorded directly on the chart in terms of gram-centimeters torque.

The curves in Fig. 1 bring out that the thick-pasting starch-resin reaction products prepared in accordance with the present invention (curve 2) cooks rapidly in alkaline tap water to a high stable viscosity while the products obtained without final adjustment of the pH to an alkaline value before drying (i. e. curve 1) cooked very slowly, even at a rate below that of native, unmodified starch itself (i. e. curve 3).

Figure 2:
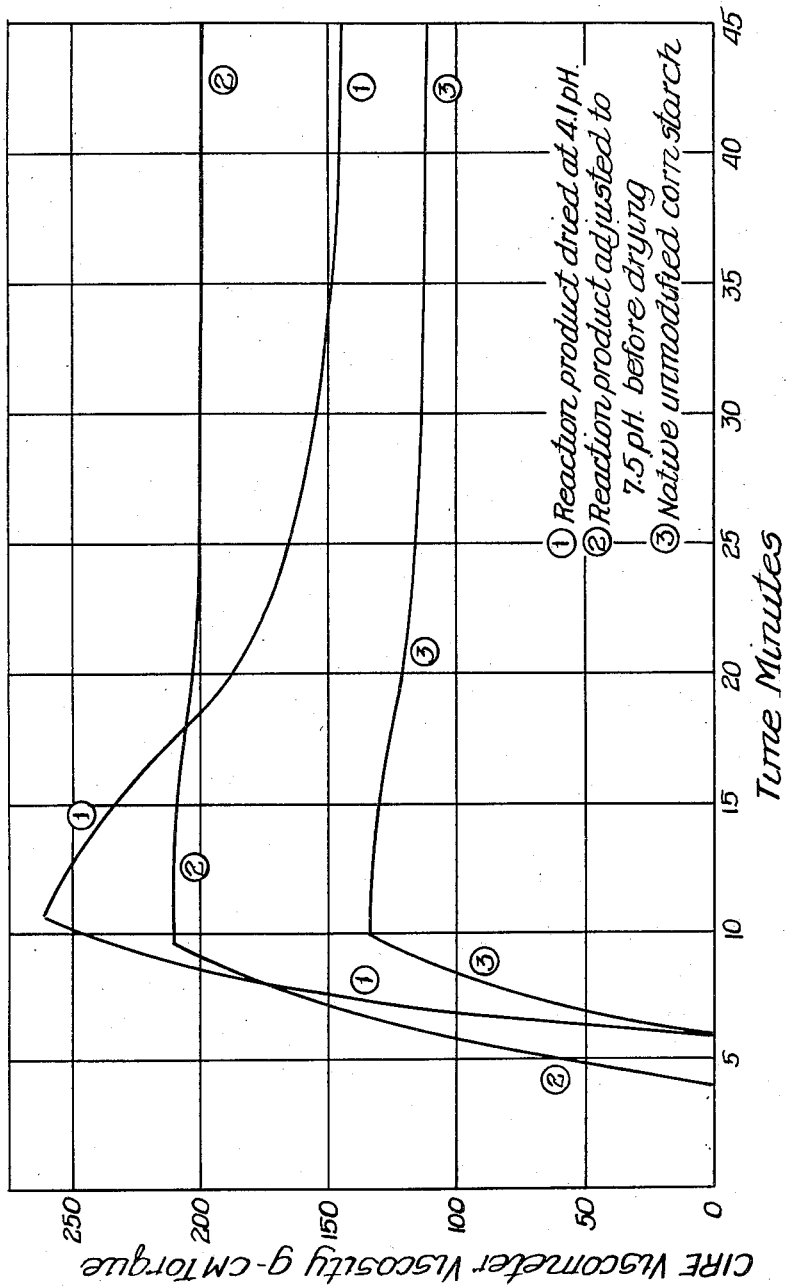

In Fig. 2 the curves correspond generally to those contained in Fig. 1 but were obtained by cooking the starch samples in distilled water as distinguished from alkaline tap water. In Fig. 2 curves 1, 2 and 3 were obtained by cooking 50 grams of corresponding dry samples in 950 grams of distilled water. These curves again clearly bring out that the starch-resin product prepared in accordance with the present invention, wherein the reaction product is made alkaline before filtering, cooks rapidly in distilled water to a high viscosity which remains stable for a long period of time. Curve 1 of Fig. 2 shows that when the starch-resin reaction product was not made alkaline before filtering and drying, it did not yield a paste the viscosity of which was heat stable, even though it reached a higher peak viscosity than the starch-resin product obtained in accordance with the present invention (i. e. curve 2).

Figure 3:
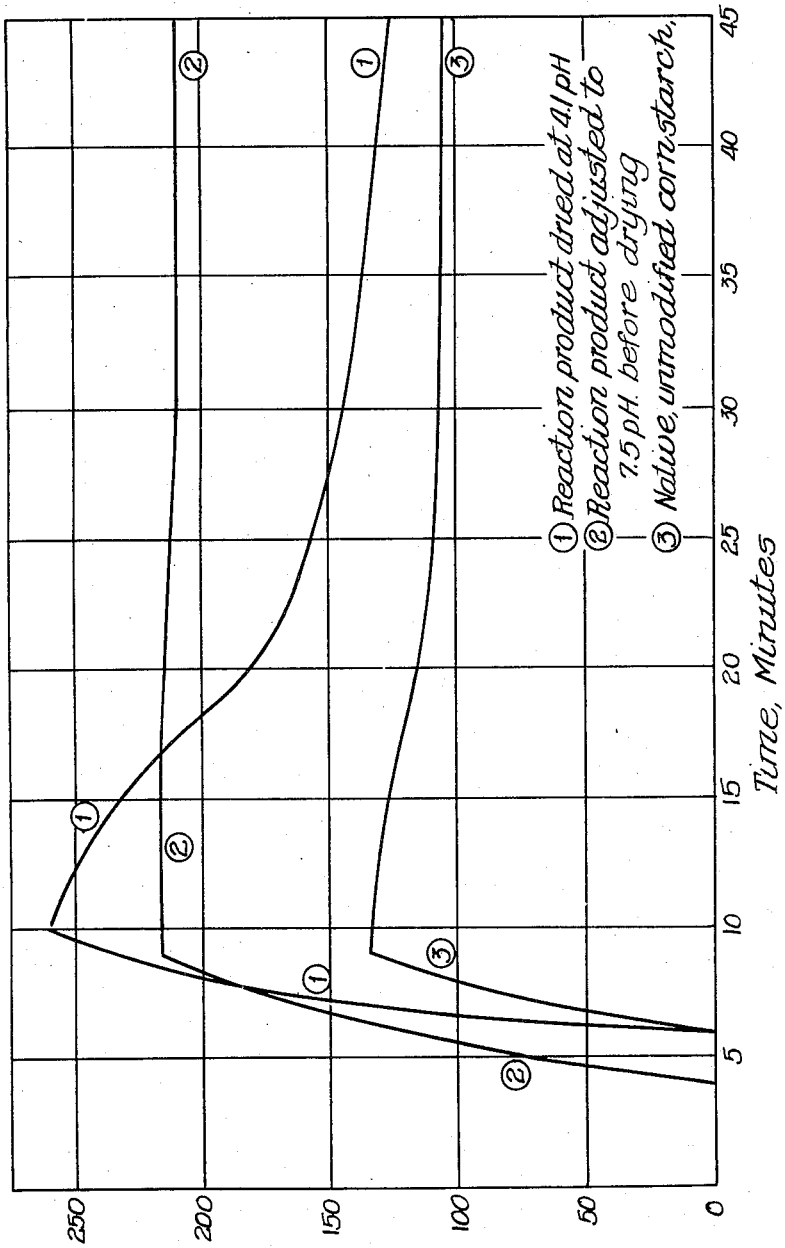

Fig. 3 contains curves showing the same relationship between the three starch samples when they are cooked in slightly acid water as when cooked in distilled water.

Fig. 4 contains five curves showing hot paste viscosities of five starch-DMN reaction products obtained by reacting 0.075% of DMU with unmodified corn starch at a pH of 4.1 after which the pH of five samples was adjusted to 7.5, 8.0, 8.5, 9.0 and 9.5 respectively, before filtering and drying. It will be seen that the viscosity of the 7.5 pH sample remains practically level (i. e. constant) whereas the higher pH value samples have an increased tendency to have peak values and then fall off. On this basis, it appears unnecessary and undesirable to adjust to an alkaline pH above 10.

Having fully described my invention, what is claimed as new is:

1. A process of preparing a starch product characterized by its ability to cook rapidly in an aqueous medium to form high viscosity starch pastes which are stable at high temperatures which comprises, reacting at an acid pH and at a temperature of at least 70° F. but substantially below the pasting temperature of the starch an aqueous slurry of unmodified starch with from about 0.05–0.15% of at least one water-soluble, heat-reactive, urea-formaldehyde composition selected from the group consisting of dimethylol urea, monomethylol urea, and water-soluble urea-formaldehyde resin, based on the weight of the starch in said slurry, adjusting the pH of the reacted medium to an alkaline pH ranging up to about 10, and recovering the starch-resin reaction product from the alkaline medium.

2. A thick-pasting starch-resin reaction product prepared in accordance with the process of claim 1.

3. A starch paste prepared by cooking in water a thick-pasting starch-resin reaction product prepared in accordance with the process of claim 1.

4. A process of preparing thick-pasting starch which is relatively non-sensitive to pH and cooks rapidly in water to form a high viscosity paste having excellent heat stability, comprising, reacting at a pH of from about 3–5 and at an elevated temperature substantially below the pasting temperature of the starch an aqueous slurry of unmodified starch containing from about 0.05–0.15% of at least one water-soluble, heat-reactive, urea-formaldehyde composition selected from the group consisting of dimethylol urea, monomethylol urea, and water-soluble urea-formaldehyde resin, based on the dry weight of the starch, adjusting the pH of the reacted medium to an alkaline pH ranging up to 10 and recovering the starch-resin reaction product from the alkaline medium.

5. The process of claim 4 wherein the urea-formaldehyde composition is dissolved in alkaline water before it is mixed with the starch slurry.

6. The process of claim 4 wherein the starch-resin reaction product is recovered by filtering the alkaline reaction medium and drying the filter cake.

7. The process of claim 4 wherein the reaction time is from 1–4 hours and the reaction temperature is from about 100–120° F.

8. A thick-pasting starch-dimethylol urea reaction product prepared in accordance with the process of claim 4.

9. The process of claim 4 wherein the unmodified starch is corn starch.

10. A thick-pasting starch-resin reaction product prepared in accordance with the process of claim 9.

11. A process of preparing thick-pasting starch which is relatively non-sensitive to pH and cooks rapidly in water to form a high viscosity paste having excellent heat stability, comprising, reacting at a pH of from about 3–5 and at an elevated temperature substantially below the pasting temperature of the starch an aqueous slurry of native starch containing from about 0.05–0.15% of dimethylol urea based on the dry weight of the starch, adjusting the pH of the reacted medium to an alkaline pH ranging up to 10 and recovering the starch-resin reaction product from the alkaline medium.

No references cited.